Dec. 2, 1952          F. A. JONES          2,620,226
MULTIPLE HOPPER TRAILER
Filed Sept. 8, 1950          6 Sheets-Sheet 2
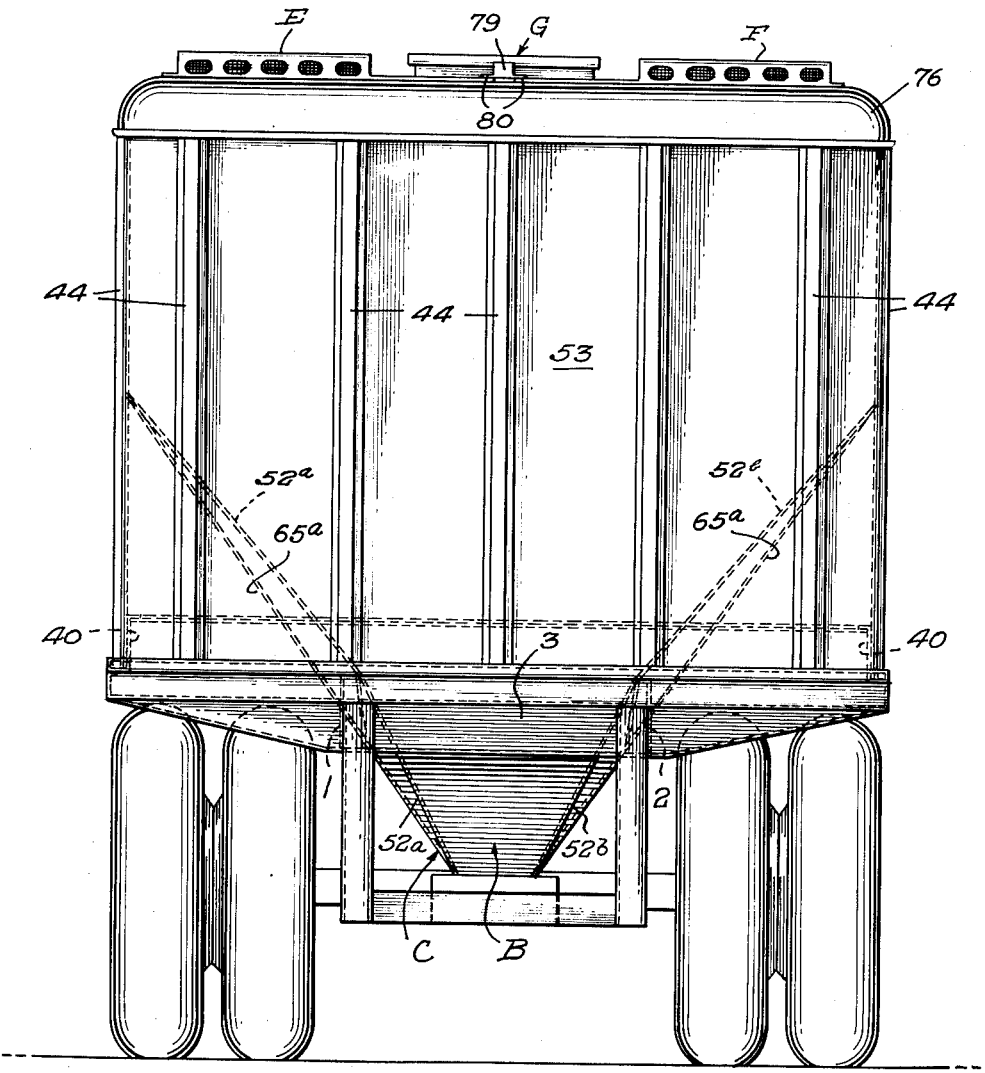
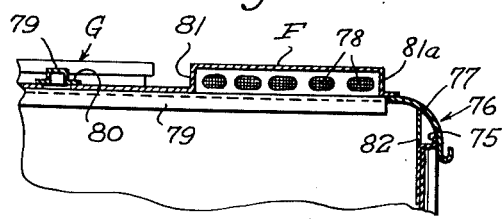
Inventor
FRANK A. JONES
By Ralph J. Bassett
Attorney Dec. 2, 1952           F. A. JONES          2,620,226
MULTIPLE HOPPER TRAILER Filed Sept. 8, 1950                           6 Sheets-Sheet 3

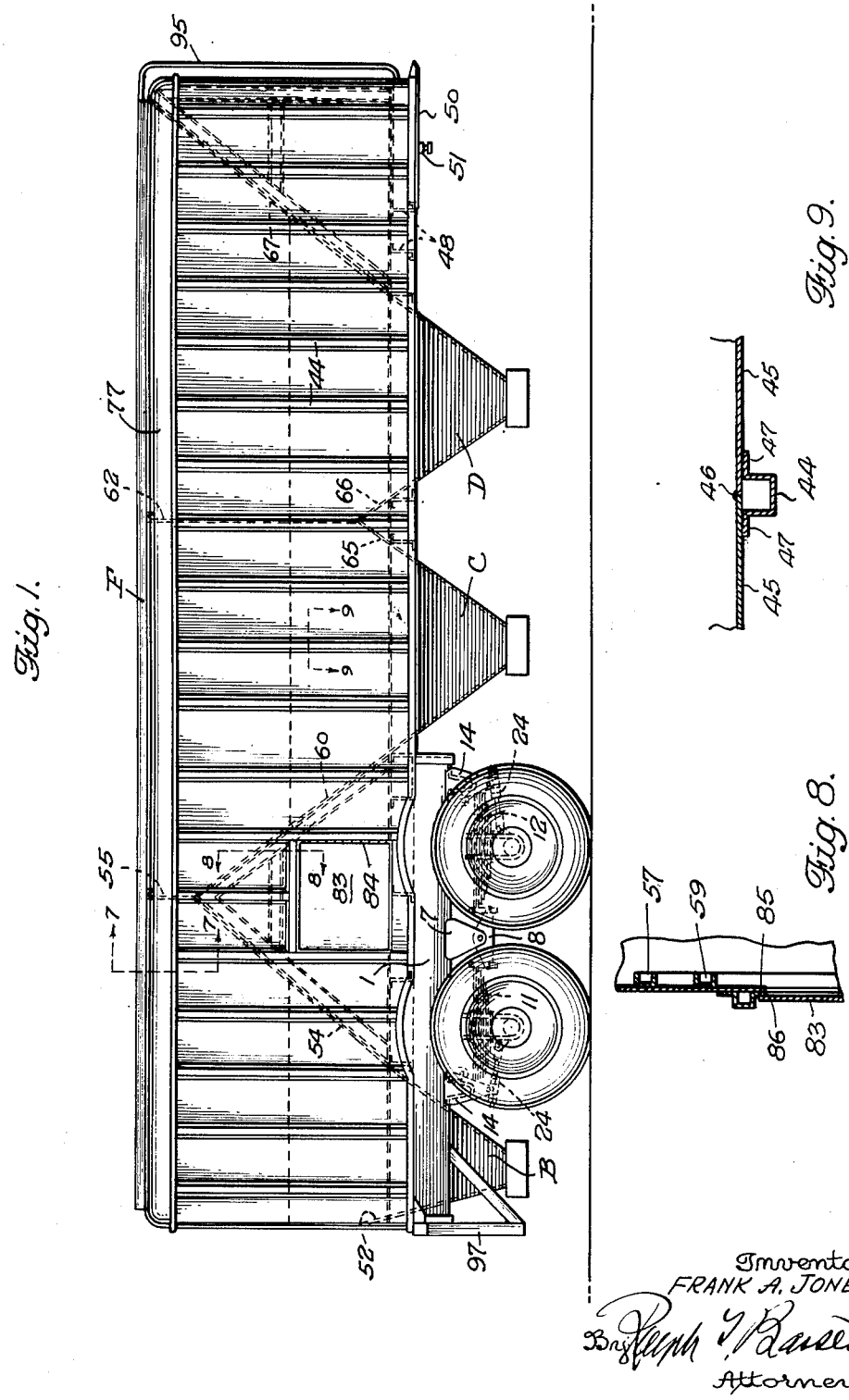

Inventor
FRANK A. JONES
By Ralph L. Barrett
Attorney

Dec. 2, 1952      F. A. JONES      2,620,226
MULTIPLE HOPPER TRAILER
Filed Sept. 8, 1950      6 Sheets-Sheet 4
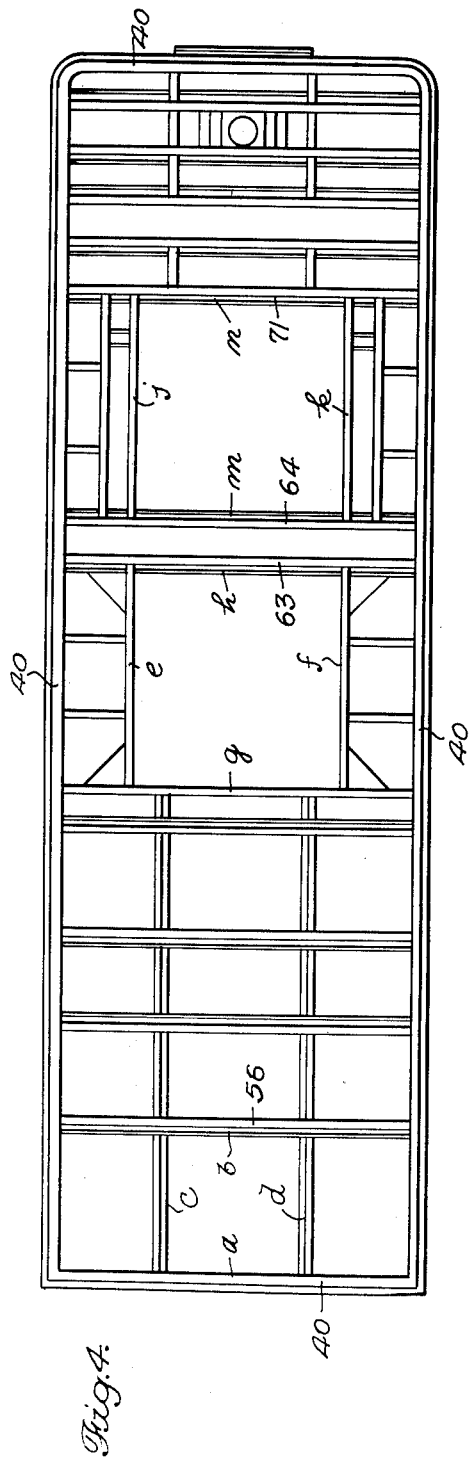
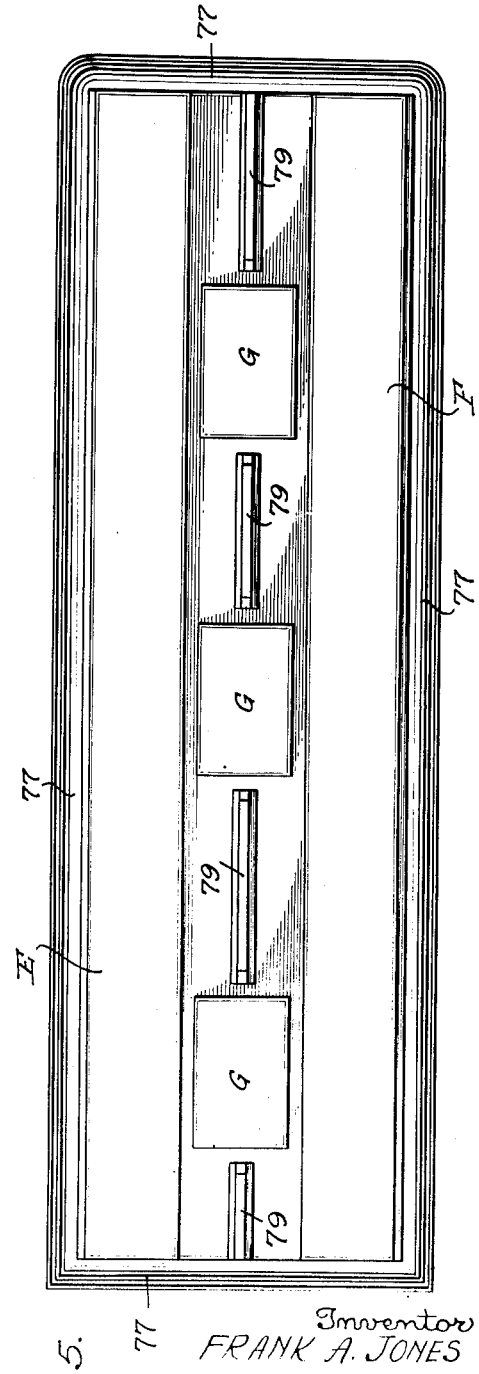
Fig.4.
Fig.5.
Inventor
FRANK A. JONES
By Ralph V. Bassett
Attorney Dec. 2, 1952 F. A. JONES 2,620,226
MULTIPLE HOPPER TRAILER
Filed Sept. 8, 1950 6 Sheets-Sheet 5

Inventor
FRANK A. JONES
By Ralph L. Bassitt
Attorney

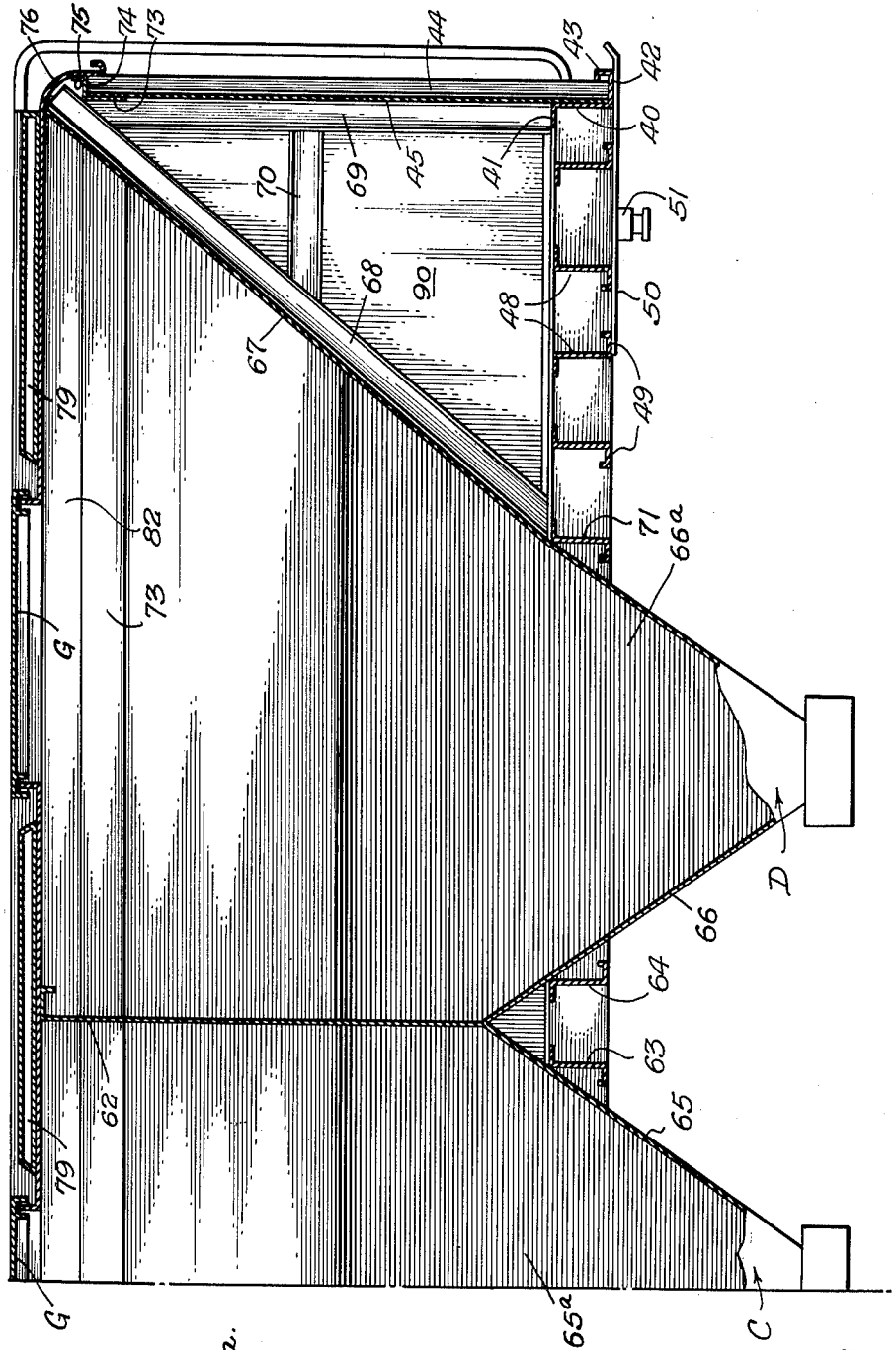

Patented Dec. 2, 1952

2,620,226

UNITED STATES PATENT OFFICE 2,620,226

MULTIPLE HOPPER TRAILER

Frank A. Jones, Bristol, Tenn., assignor to Enterprise Wheel and Car Corporation, Bristol, Va.

Application September 8, 1950, Serial No. 183,852

9 Claims. (Cl. 298—27)

This invention relates to improvements in hopper trailers for road and rail vehicles, although in the present illustration the disclosure is designed for use in connection with road tractors.

An object of this invention is to provide a hopper with maximum capacity for use in connection with conventional motor trucks, the arrangement of the parts being such that all space is available for utilization either for hopper carrying lading or miscellaneous lading contained in compartments provided in the space not occupied by the hoppers.

Another object of the invention is to provide a tractor-drawn hopper trailer supported by a twin axle truck, the truck supporting the trailer by means of springs and equalizer units which tend to maintain the axles and, therefore, the tires in proper road alignment regardless of the load condition of the hopper.

Another feature of the invention is the arrangement of a dual axle assembly at the rear of the trailer and between the two rear hoppers, the dual wheel and axle assembly including spring suspension with equalizer unit torque rods, all of which are arranged and supported by a truck unit independent of the trailer body structure.

Figure 3:
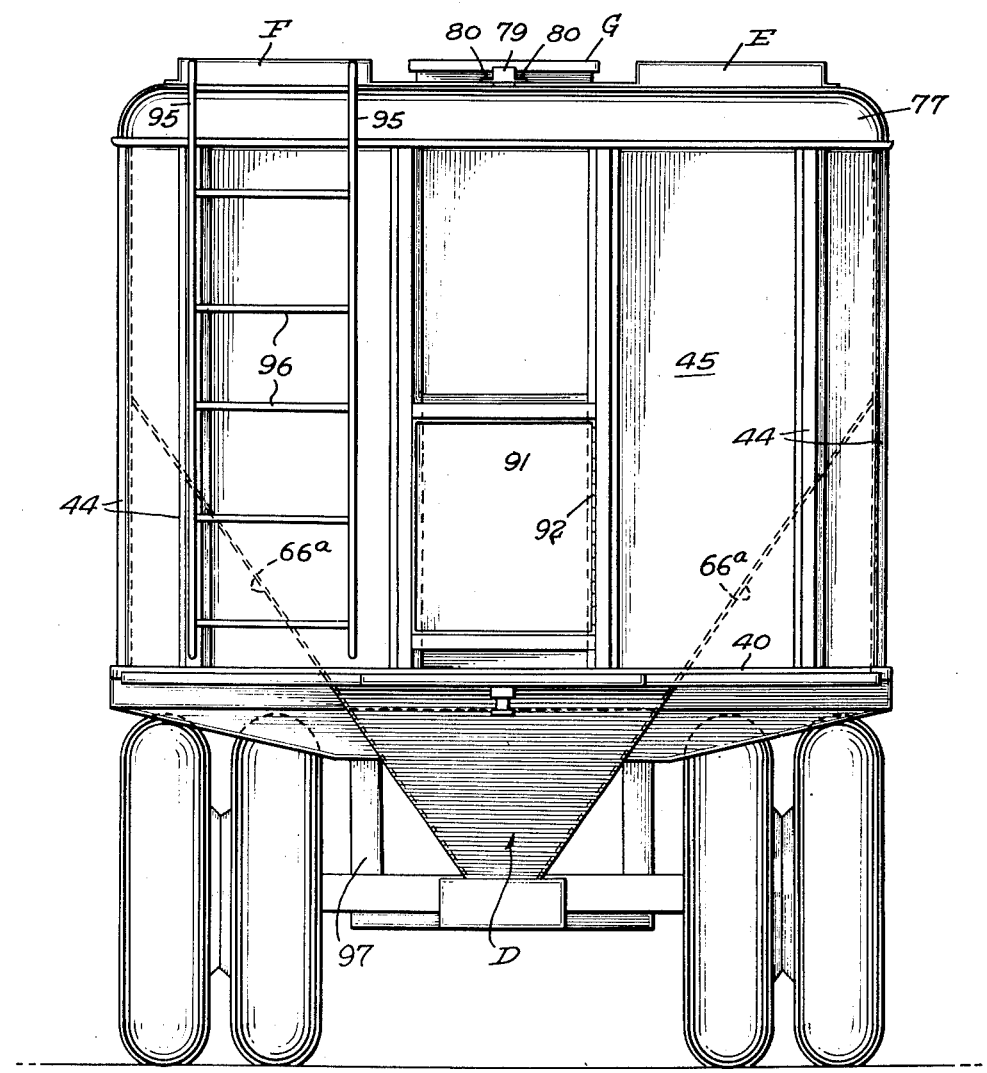
Figure 6:
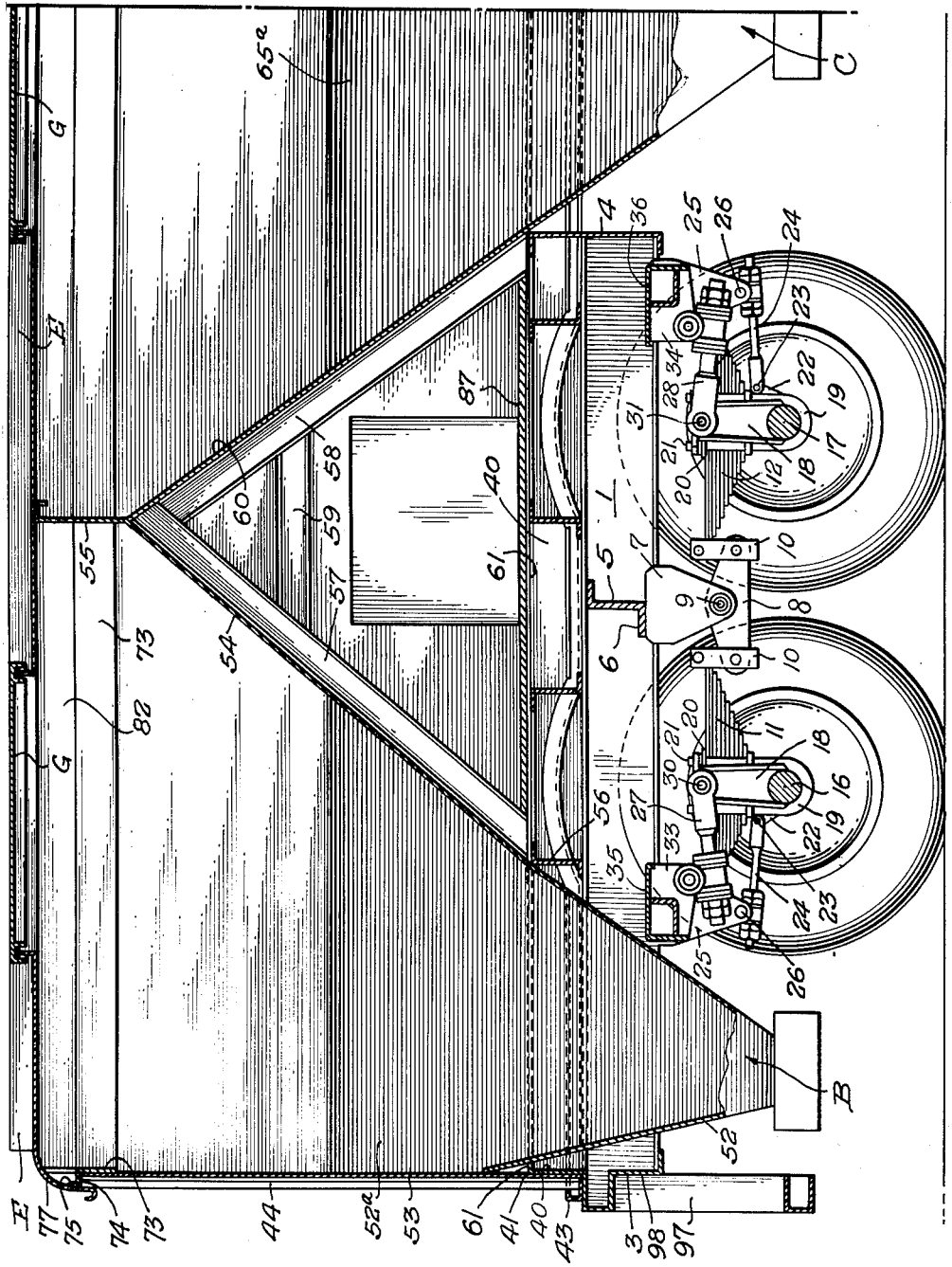

Other features of the invention, including the wall structure of the trailer body, the construction and arrangement of the hoppers to insure maximum capacity and proper unloading facilities, roof structure, including the construction and arrangement of the runningboards, the intermediate arrangement of the loading hatches, and the frame and supporting structure will more clearly hereinafter appear by reference to the accompanying drawings forming a part of this application wherein like characters of reference designate corresponding parts throughout the several views, in which:

Fig. 1 is a side elevation of the assembly;
Fig. 2 is a rear elevation;
Fig. 3 is a front elevation;
Fig. 4 is a top plan view of the underframe;
Fig. 5 is a top plan view of the hopper assembly;
Fig. 6 and Fig. 6ª are longitudinal sectional views;
Fig. 7 is a section on line 7—7 of Fig. 1;
Fig. 8 is a section on line 8—8 of Fig. 1; and
Fig. 9 is a section on line 9—9 of Fig. 1.

Referring now to Figs. 1 and 6, the suspension of the trailer is by means of a sub-frame which supports a tandem axle assembly. The subframe includes side members 1 and 2 and connecting end frame members 3 and 4. This frame is formed of inwardly facing channels of proper dimension and includes a medial transverse brace 5 of Z form. The lower flange 6 of the Z-bar is positioned above the lower flange of the channel structure of the main frame to provide room for the hangers 7 which support the equalizing beams 8, by means of the cross rod 9 in the usual manner. The equalizing beams 8 are provided beneath each of the longitudinal side members 1 and 2 of the sub-frame and medially of their length. The equalizing beams 8 are provided at each end with the shackles 10 and these shackles connect the beams 8 with the adjacent ends of the leaf spring assemblies 11 and 12. The outer ends of the leaf spring assemblies 11 and 12 normally bear against the depending stools shown in dotted lines at 14, which stools have lower rounded bearing faces and their upper portions suitably flanged outwardly and welded to the bottom flanges of the frame structure. The springs 11 and 12 are supported on the axles 16 and 17 resting on saddles 22 in the usual manner and secured to the axles by U-bolts 19 which are arranged in pairs at each side of the springs and by means of clamp plates 20 and nuts 21 maintain the parts in assembled position.

Each saddle 22 is provided at its outer face with a projection or ear which is formed with a transverse opening for the reception of a bolt or pin 23 to which is hinged a radius rod 24, these rods being supported at their outer ends by hangers 25 which are likewise formed with transverse openings for the reception of the securing bolts or pins 26 as is conventional in such assemblies. By means of the heretofore described spring suspension, positive alignment of both axles may be secured by proper adjustment of the radius rods 24 and this alignment is maintained under all road and load conditions. It is understood, of course, that the spring suspension is identical at each end of each axle and the arrangement eliminates the possibility of misalignment of the tandem axles which would result in excessive wear on the tires and reduce the normal trackage. In addition to the foregoing, means are provided for maintaining the forward axle against an inherent tendency to lift vertically or "hop" under braking conditions, this mechanism including torque rods 27 and 28 for the two axles and positioned medially thereof, said torque rods projecting outwardly from the axles. The torque rods 27 and 28 are pivotally connected at their inner ends to torque rod brackets through the medium of the pivot pins 30 and 31, while the outer ends of these torque rods are connected to the hangers 33 and 34, welded medially to the transverse braces 35 and 36, respectively, of the sub-frame. The transverse braces are shown as formed as box girders, which include inverted channel sections and base sections, the base sections being of L-form and lying against and being welded at their marginal edges to the channels to provide for the reception of the arms of the brackets 33 and 34. It is preferred that the pivots 30 and 31 include rubber-in-shear mounting of the Lord type which is well known in the art and includes eccentric tubing with intermediate bonded rubber sections to lend to the structure an inherent resiliency.

The trailer body includes a main lower outer frame of Z-form with the intermediate section of the angle 40 arranged vertically, and the upper flange 41 extending inwardly and the outer lower flange 42 extending upwardly and inwardly as shown in Fig. 6a at 43 to provide a trough or molding for receiving the lower ends of the vertical channel body posts 44 forming the spaced reinforcing elements of the body of the vehicle. The body of the vehicle is formed of vertical plates or sheets 45 and the adjacent ends of the plates, where welded together as at 46, are positioned within the flanges 47 of the channel body posts 44 (see Fig. 9). The flanges 47 of the channel body posts 44 are relatively wide and lie flush against the plates and are welded thereto to add strength to the sheet structure. The transverse frame elements 48 extend across the longitudinal side sills of the body as formed by the Z-frame 40 and the lower angled extremities of the transverse Z-frame elements 48 have their bottom faces 49 flush with the bottom of the outer frame structure 40 to provide for the mounting of the sheet 50 which supports the coupler element 51 as shown in Fig. 6a. It will be noted by reference to Fig. 1 that the transverse frame elements 48 are in each instance spaced laterally of the upright channel body posts 44 and that the body posts are uniformly spaced throughout the assembly, while the transverse frame brace members 48 are positioned intermediate the hopper structures.

A maximum hopper capacity is provided by arranging a single hopper B at the rear of the tandem axle assembly and two hoppers C and D forwardly of the tandem axle assembly. The rear hopper B is formed by rear sheet 52 which extends transversely of the vehicle body and is fixed to the rear wall 53 immediately above the lower framing 40. The front wall of the rear hopper B is formed of a slope sheet 54 which extends from the lower marginal edge of the transverse brace 55 to the discharge extremity and entirely across the car structure. The forward wall 54 of hopper B has its front portion, which lies against the transverse framing element 56 and connects with the upper transverse brace 55, lying in a plane of approximately 50 degrees while the lower portion of the front wall lies in a plane of approximately 55 degrees, this arrangement of the forward sheet providing maximum capacity of the hopper while maintaining the critical angle of discharge and clearing the car structure. Side slope sheets 52a and 52b are provided, having their lower portions slightly deflected downwardly about the rear hopper frame shown in the disclosure of the main frame, Fig. 4, and defined by the frame element parts $a$, $b$, $c$, and $d$. In addition to the front slope sheet 54 of the hopper B resting on the transverse frame element 56, this slope sheet is further supported by an A-frame formed of angularly arranged channels 57 and 58 connected by the cross channel 59. The apex of the A-frame is in vertcial alignment with the cross brace 55 and the latter is welded to the slope sheet 54 and the adjacent slope sheet 60 of the next hopper at the apex of the frame. The lower extremities of the A-frame members 57 and 58 lie in a horizontal plane and upon the flange 61 of the outer frame structure 40. Two of these A-frame assemblies are provided for the hoppers B and C, one at each side of the car structure and the angles of the frame members 57 and 58 correspond to the angles of the slope sheet which they support so as to maintain a continuously supported surface for these sheets.

Forward of the tandem axle supporting structure are the hoppers C and D, these hoppers occupying the entire space between the upper cross brace 55 at the apex of the rear A-frame and the front of the trailer structure. The hoppers C and D are of substantially the same capacity and same shape, being separated by the vertical partition 62 which extends from a point medially of and directly above the cross frame members 63 and 64. These cross frame members 63 and 64 are similar in structure to all of the cross frame members 48 and the upper angles of these cross frame members 63 and 64 form a support for the slope sheet 65 of hopper C and slope sheet 66 of hopper D. The slope sheets 65 and 66 are at substantially 55 degrees and at their point of intersection they are welded to the partition 62 as heretofore stated. Hopper C is defined at its rear by the inclined wall 60 which rests upon the legs 58 of the rear pair of A-frames. The rear wall 60 of the hopper C lies in a common plane throughout its length to the point of discharge which is controlled by a suitable valve, preferably of the Kwickleen type. The forward wall 67 of the hopper D is supported at each side by the inclined legs 68 of the forward A-frame, which latter includes the upright leg 69 and the horizontal connection 70, all of which are of inwardly facing channel form as in the instance of the rear A-frames. The angularly arranged legs 68 of the forward A-frame lies in a plane of approximately 51 degrees and the wall 67 which lies flush against these legs 68 consequently are at the same angle. The bottom portion of the hopper from its point of contact with the cross frame member 71 to the gate lies in a plane of approximately 55 degrees and in this manner generally corresponds to the structure of the forward wall of the rear hopper B.

The side slope sheets for hoppers C and D are indicated by reference characters 65a and 66a, each being at 55 degree angles as indicated in Fig. 2. These side slope sheets 65a and 66a maintain a permanent angle and are supported medially by the underframe members $e$, $f$, $j$, and $k$ shown in Fig. 4. The hopper opening in the underframe for hopper C is defined by the longitudinal frame elements $e$ and $f$, and the transverse frame elements $g$ and $h$, while the hopper frame opening for hopper D is defined by the longitudinal frame elements $j$ and $k$ and the transverse frame elements $m$ and $n$.

The front and side walls, as heretofore stated, include upright panels which are marginally welded and the vertical channel body posts 44. The upper marginal edge of the side and end walls is braced internally by the leg 73 of an angle member, the medial portion 74 of which extends horizontally over the upper ends of the side and end walls and terminates in an upright flange 75 which receives the outer margin of roof structure 76.

Referring to Fig. 7 it will be noted that the roof structure includes the cornice 77 which overhangs the flange 75 of the top angle, being in the present instance suitably rounded and having its inner flange welded to the roof which embodies the runningboards E and F, each of which is formed as a part of the roof structure and lie at either side of the hopper opening G.

The runningboards are relatively wide and extend the full length of the car structure and have ventilating openings 78 which are covered with a suitable screen approximating 200 mesh. The runningboards are formed by a plurality of plates which run end to end of the car structure and are connected medially by the downwardly facing channel 79, the flanges 80 of which overlie the adjacent marginal edges of the plates and form a connecting strut therebetween. The runningboards are defined by the side walls 81 and 81ª which are of such a height as to lie substantially flush with the cover provided for the hopper opening. The connecting channel braces 79 lie below the top surface of the hopper cover and of the runningboards. Internal longitudinally extending plates 82 connect the curved upper cornice plates 77 at their medial portion with the inner faces of the side walls and tend to brace the side walls against lateral distortion.

Referring now to Fig. 8 there is shown a section taken on line 8—8 of Fig. 1 illustrating the wall and door structure communicating with the space between the arms of the A-frames supporting and defining the two rear hoppers. The door 83 having the hinge 84, swings on said hinge and has its marginal edges abutting the flanges 85 of the adjacent body post 44. The door likewise overlies the adjacent wall structure, abutting against flanges 86 forming a framing about the door opening. The compartment formed between the rear hoppers may be provided with suitable deck plates shown at 87 and this compartment may be used as desired in the transporting and storing of equipment or lading. A similar compartment 90 is shown by the space defined by the forward A-frames, which include the frame elements 68—69—70 and which is located forward of the front hopper doorway, similar in construction to the doorway in the rear compartment, this door being shown in Fig. 3 and indicated by reference character 91, mounted on hinges 92 and framed and positioned in the same manner and by the same body posts as in the instance of the side door communicating with the rear auxiliary compartment.

A ladder formed of suitable tubular material is formed of upright frame members 95 and is provided with steps 96 in the usual way, permitting access to the runningboards and the hoppers at the top of the hopper car structure. At the rear end of the trailer structure is the depending guard frame 97 formed of channels and lying in the same vertical plane with the hopper main frame outer wall. This guard 97 is of rectangular form and extends down beneath the frame to substantially the position of the gate of the rear hopper B to protect these parts against injury. The guard frame is nested in the offset formed by the inwardly spaced channel 98 of the frame structure.

The structure in question maintains the contour of the standard trailer, has maximum hopper capacity, contains ample load support, and includes a spring suspension which can be included as a unit in manufacture.

What I claim is:

1. In a hopper trailer for road tractors including an underframe having side and end sills, brace members connecting the side sills and partially defining a rear hopper opening and a pair of forward hopper openings spaced from the rear hopper opening, a separate sub-frame assembly attached to the underframe and mounting a pair of spaced parallel axles, springs mounted on each of said axles, adjustable means for maintaining each of the axles in parallel aligned relation, said means connecting each of the axles with the sub-frame, hopper structures supported by the underframe, side and end walls and a roof structure enclosing the hoppers, said side and end walls extending vertically from the underframe, hopper openings formed in the roof for each of the hoppers, said roof structure including runningboards formed at each side of the hopper openings and extending longitudinally of said roof structure.

2. The structure of claim 1 characterized in that the runningboards formed at each side of the hopper openings are constructed by elevating continuous integral parts of the roof at points spaced laterally of each side of the hopper openings.

3. In a hopper trailer for road tractors including an underframe having side and end sills, spaced brace members connecting the side sills and defining the transverse sides of hopper openings, longitudinal braces connecting certain of the transverse brace members and defining the longitudinal sides of an adjacent pair of forward hopper openings, a separate sub-frame assembly attached to the underframe between a pair of hopper openings and mounting a pair of spaced parallel axles, said sub-frame including longitudinal side frame members and transverse frame members, the longitudinal frame members of said sub-frame defining the longitudinal side walls of the rear hopper opening, spring means supported on the axles between the sub-frame and axles to cushion the latter, wheels on said axles, side and end walls and a roof structure supported by the underframe, said side and end walls being in vertical alignment with said underframe, hopper walls within the trailer each formed of slope sheets arranged at a suitable angle of inclination to permit the discharge of lading in the hoppers by gravity, said roof structure forming the top wall of each of the hoppers and being provided with hopper openings, and closures for said openings.

4. The structure of claim 3 characterized in that the roof is formed of a plurality of sheets and the roof sheeting is medially elevated to form runningboards at each side of the hopper openings.

5. In a hopper trailer for road tractors including an underframe having side and end sills, spaced brace members connecting the side sills and defining the transverse sides of hopper openings, longitudinal braces connecting certain of the transverse brace members and defining the longitudinal sides of an adjacent pair of forward hopper openings, a separate sub-frame assembly attached to the underframe and mounting a pair of spaced parallel axles, said sub-frame including longitudinal side frame members and transverse frame members, the longitudinal frame members of said sub-frame defining the longitudinal side walls of the rear hopper opening, spring mountings for said axles, wheels on the axles, side and end walls supported by said underframe, a roof covering the side and end walls, said roof being formed with hopper openings, closures for said openings, hopper walls arranged within said side and end walls of said trailer, each of said hopper walls being supported medially by a frame member, and A-frames supporting the inner walls of each of said hoppers, said A-frames being supported at their bottom extremities upon said underframe.

6. In a hopper trailer for road tractors including an underframe having side and end sills, a separate sub-frame assembly arranged beneath the main frame and supporting at the rear end of the main frame, a spring mounted traction assembly, a pair of hoppers arranged forwardly of the traction assembly, said hoppers being defined by slope sheets supported medially on the underframe, a hopper arranged rearwardly of the traction assembly and defined by slope sheets supported on the sub-frame, said side and end walls for the hopper trailer being connected with the front marginal edges of the slope sheets defining the hoppers, a roof for the assembly including hopper openings, and valves controlling the discharge from said hoppers.

7. The structure of claim 6 characterized in that the roof is formed of a plurality of plates which are connected medially by inverted channels and which have longitudinally extending horizontal portions defining runningboards arranged at each side of the hopper openings.

8. The structure of claim 6 characterized in that an A-frame is arranged between the rear hopper and the adjacent forward hopper and supports the hopper walls above the traction assembly, and a deck structure is provided between the legs of the A-frame to form a storage compartment.

9. The structure of claim 6 characterized in that the front wall of the front hopper is supported by A-frames having vertical forward legs extending along the front wall of the body, a deck portion within the front A-frame assemblies defining a compartment, and a door for the compartment.

FRANK A. JONES.

REFERENCES CITED

The following references are of record in the file of this patent:

UNITED STATES PATENTS

| Number | Name | Date |
| --- | --- | --- |
| 2,051,984 | Cartzdafner | Aug. 25, 1936 |
| 2,226,100 | Larison | Dec. 24, 1940 |
| 2,250,262 | Hill | July 22, 1941 |

FOREIGN PATENTS

| Number | Country | Date |
| --- | --- | --- |
| 215,414 | Great Britain | 1923 |